US010539115B1

(12) United States Patent
Rodrigues et al.

(10) Patent No.: US 10,539,115 B1
(45) Date of Patent: Jan. 21, 2020

(54) VERTICAL WIND TURBINE

(71) Applicants: Dilson dos Santos Rodrigues, Hewitt, TX (US); Donald Coy Beaman, Kosse, TX (US)

(72) Inventors: Dilson dos Santos Rodrigues, Hewitt, TX (US); Donald Coy Beaman, Kosse, TX (US)

( * ) Notice: Subject to any disclaimer, the term of this patent is extended or adjusted under 35 U.S.C. 154(b) by 366 days.

(21) Appl. No.: 15/263,378

(22) Filed: Sep. 13, 2016

Related U.S. Application Data

(60) Provisional application No. 62/290,449, filed on Feb. 3, 2016.

(51) Int. Cl.
| | |
|---|---|
| *F03D 3/00* | (2006.01) |
| *F03D 7/06* | (2006.01) |
| *F03D 7/04* | (2006.01) |
| *F03D 3/06* | (2006.01) |

(52) U.S. Cl.
CPC .............. *F03D 3/068* (2013.01); *F03D 3/005* (2013.01); *F05B 2240/214* (2013.01); *F05B 2260/72* (2013.01)

(58) Field of Classification Search
CPC . F03D 3/005; F03D 3/007; F03D 3/06; F03D 3/062; F03D 3/067; F03D 3/068; F03D 7/06; F03D 7/041; F05B 2240/201; F05B 2240/202; F05B 2240/214; F05B 2260/72
See application file for complete search history.

(56) References Cited

U.S. PATENT DOCUMENTS

| | | | | |
|---|---|---|---|---|
| 3,995,170 A | * | 11/1976 | Graybill | F03D 3/067 290/55 |
| 4,293,274 A | * | 10/1981 | Gilman | F03D 3/061 416/132 B |
| 4,406,584 A | * | 9/1983 | Stepp | F03D 7/06 416/119 |
| 4,496,283 A | * | 1/1985 | Kodric | F03D 3/067 416/119 |
| 4,764,090 A | * | 8/1988 | Danson | F03D 3/068 416/119 |
| 2011/0181047 A1 | * | 7/2011 | Dulcetti Filho | F03D 3/02 290/55 |
| 2012/0243990 A1 | * | 9/2012 | Kosch | F03D 3/067 416/9 |

(Continued)

*Primary Examiner* — Igor Kershteyn
(74) *Attorney, Agent, or Firm* — Thrasher Associates

(57) ABSTRACT

Disclosed is a vertical axis wind turbine apparatus. The apparatus includes carousal shafts operatively connected to a fixed turbine axis. The turbine blades are pivotally attached to carousal plates. The wind-facing turbine blades get exposed to a maximum area by stretching away from the fixed turbine axis, and the turbine blades that are not exposed to wind get folded inside toward the fixed turbine axis. The stretching and folding of the blades is affected by timing and restricting shafts, which emerge from the offset timing shaft. The present construction reduces the drag caused by turbine blade exposure in negative wind direction and increases energy production by simultaneously allowing maximum blade exposure in the positive wind direction. Furthermore, the apparatus in one embodiment includes counterweights to provide more stability to the offset shaft operation.

9 Claims, 5 Drawing Sheets

(56) References Cited

U.S. PATENT DOCUMENTS

| | | | |
|---|---|---|---|
| 2013/0285382 A1* | 10/2013 | Grigg | F03D 3/002 290/54 |
| 2014/0147274 A1* | 5/2014 | Longmire | F03D 7/06 416/13 |
| 2014/0361539 A1* | 12/2014 | Carter | F03D 7/06 290/44 |

* cited by examiner

VERTICAL WIND TURBINE

CROSS-REFERENCE TO RELATED APPLICATION

The invention is related to and claims priority from US Provisional Patent Application No. 62/290,449 filed on Feb. 3, 2016, entitled VERTICAL WINDMILL and having common inventors Beaman and Rodrigues.

TECHNICAL FIELD

The present invention is generally related to a vertical axis wind turbine (VAWT).

BACKGROUND

Wind energy is one of the most cost-effective forms of renewable energy, with ever-increasing global installed capacity. Wind turbines are generally categorized as horizontal axis wind turbines (HAWTs) or VAWTs. A VAWT is more efficient, simpler, and significantly cheaper to build and maintain than an HAWT. VAWTs have other advantages, such as they always face the wind that enable the production of cheap and clean electricity. Furthermore, VAWTs do not require steering into the wind and have a large surface area for capturing wind energy. VAWTs can be installed at various locations, including roofs, highways, and parking lots. These produce less noise and can be scaled up from mill watts to megawatts.

The demand for renewable energy is on the rise; as a result, there is increasing focus on developing advanced models of VAWTs. The design of a conventional VAWT is complex, as the offset shaft is located outside the turbine axis. Furthermore, the offset shaft emerges from an independent shaft, resulting in unstable offset shaft operations. Therefore, an apparatus is required to counter the limitations mentioned above.

Further limitations and disadvantages of conventional and traditional approaches will become apparent to one of skill in the art through comparison of described systems with some aspects of the present disclosure, as set forth in the remainder of the present application and with reference to the drawings.

DISCUSSION OF RELATED ART

CN104329219A of Song Baowei et al. is related to a VAWT with an offset shaft placed in the middle of the turbine axis. However, the offset shaft emerges from an independent shaft that is parallel to the turbine rotational axis. The complicated design leads to higher turbine costs.

Various embodiments of the present invention target the requirements mentioned above and others related thereto.

SUMMARY OF THE INVENTION

A VAWT apparatus is provided substantially, as shown in and/or described in connection with at least one of the figures, as set forth more completely in the claims.

According to the embodiments illustrated herein, a VAWT apparatus is provided. The apparatus includes a fixed turbine axis, a plurality of carousal shafts, a plurality of carousal plates, a plurality of turbine blades, an offset shaft assembly, a plurality of OTSs, a plurality of counterweights, and a plurality of timing and restricting shafts (TRSs).

The carousal shafts are operatively connected to the fixed turbine axis. The carousal plates are attached to the carousal shafts. The turbine blades are pivotally attached to the carousal plates. The plurality of turbine blades includes one or multiple first turbine blades to receive wind, and one or more second turbine blades that are unexposed to wind. In one embodiment, the first turbine blade is exposed to a maximum area by stretching away from the fixed turbine axis and the second turbine blade gets folded inside toward the fixed turbine axis.

The offset shaft assembly is configured at the middle of the fixed turbine axis. The offset shaft assembly includes OTSs suspended to the carousal shaft. In one embodiment, the OTS is offset from the center of the plurality of carousal plates and floats freely from the respective suspended carousal shaft in order to reduce the aerodynamic drag. The counterweights form a junction between the top carousal shaft and the bottom carousal shaft. TRSs emerge from the OTS to connect with the plurality of turbine blades in order to execute the operations of stretching away and folding inside.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate, not limit, the scope, wherein similar designations denote similar elements, and in which.

DETAILED DESCRIPTION

Figure 1:
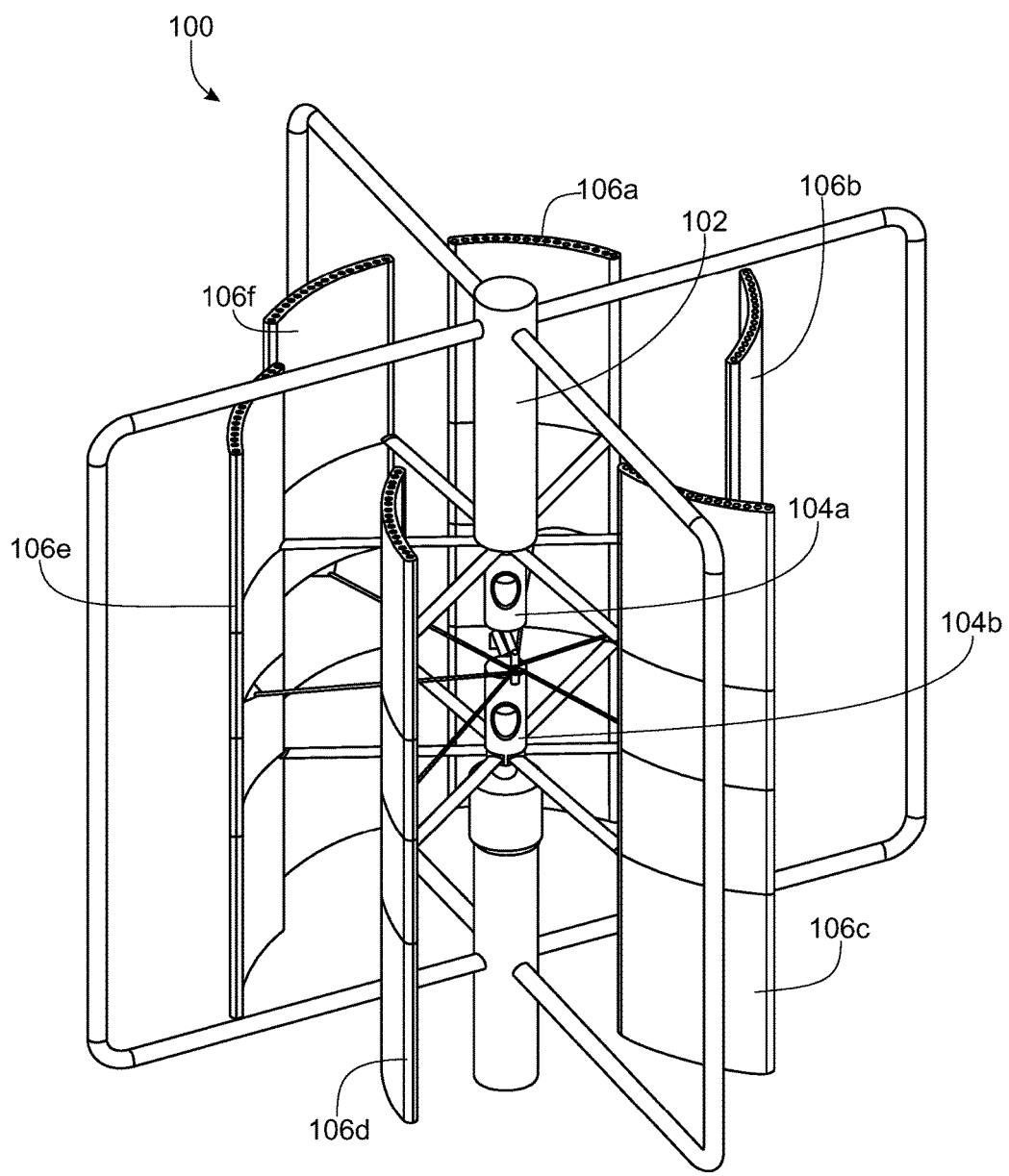
FIG. 1 illustrates a general view of the VAWT apparatus, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment", "at least one embodiment", "an embodiment", "one example", "an example", "for example", and so on indicate that the embodiment(s) or example(s) may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment.

Unless defined otherwise, all technical and scientific terms used herein have the same meaning as commonly understood by one of the ordinary skills in the art to which this invention belongs. Although any method and material similar or equivalent to those described herein can also be used in the practice or testing of the present invention, the preferred methods and materials have been described. All publications, patents, and patent applications mentioned herein are incorporated in their entirety.

It is noted that as used herein and in the appended claims, the singular forms "a", "and", and "the" include plural referents, unless the context clearly dictates otherwise. In the claims, the terms "first", "second", and so forth are to be interpreted merely as ordinal designations; they shall not be limited in themselves. Furthermore, the use of exclusive terminology such as "solely", "only", and the like in connection with the recitation of any claim element is contemplated. It is also contemplated that any element indicated to be optional herein may be specifically excluded from a given claim by way of a "negative" limitation. Finally, it is contemplated that any optional feature of the inventive variation(s) described herein may be set forth and claimed independently or in combination with any one or more of the features described herein.

All references cited herein, including publications, patent applications, and patents, are hereby incorporated by reference to the same extent as if each reference were individually and specifically indicated to be incorporated by reference, and were set forth in its entirety herein.

The recitation of ranges of values herein is merely intended to serve as a shorthand method of referring individually to each separate value falling within the range, unless otherwise indicated herein, and each separate value is incorporated into the specification as if it were individually recited herein.

FIG. 1 illustrates a general view of apparatus 100, in accordance with at least one embodiment. Apparatus 100 includes a fixed turbine axis 102, a plurality of carousal shafts (shown and explained in conjunction with FIG. 2), a plurality of carousal plates 104a and 104b, a plurality of turbine blades 106 (a-f), an offset shaft assembly (shown and explained in conjunction with FIG. 2), a plurality of offset timing shafts (shown and explained in conjunction with FIG. 2-3), a plurality of counterweights (shown and explained in conjunction with FIG. 2), a plurality of timing and restricting shafts (shown and explained in conjunction with FIG. 3), and a generator (shown and explained in conjunction with FIG. 5). The carousal shafts (shown and explained in conjunction with FIG. 2) operatively connected to the fixed turbine axis 102, and the carousal plates 104a, and 104b attached to the carousal shafts (shown and explained in conjunction with FIG. 2);

The turbine blades 106 (a-f) pivotally attached to the carousal plates 104a, and 104b. The turbine blades 106 (a-f) includes one or more first turbine blades to receive wind and one or more second turbine blades that are not exposed to wind. The one or more first turbine blades are exposed to a maximum area by stretching away from the fixed turbine axis. Further the one or more second turbine blades get folded inside toward the fixed turbine axis.

The offset shaft assembly (shown and explained in conjunction with FIG. 2) configured at a middle part of the fixed turbine axis 102. The offset shaft assembly (shown and explained in conjunction with FIG. 2) includes an offset timing shaft (OTS), and a plurality of counterweights (shown and explained in conjunction with FIG. 2).

The offset timing shafts (OTSs) (shown and explained in conjunction with FIG. 2-3) suspended to the plurality of carousal shaft (202a, and 202b). The OTS (shown and explained in conjunction with FIG. 2-3) is offset from the center of the plurality of carousal plates 104a and 104b and floats freely from the respective suspended carousal shaft (shown and explained in conjunction with FIG. 2) in order to reduce the aerodynamic drag.

The counterweights (shown and explained in conjunction with FIG. 2) form a junction between the top carousal shaft 202a and the bottom carousal shaft 202b. The plurality of timing and restricting shafts (TRSs) (shown and explained in conjunction with FIG. 3) emerge from the offset timing shaft (shown and explained in conjunction with FIG. 2-3) to connect with the plurality of turbine blades 106 (a-f) in order to execute the operations of stretching away and folding inside. In an alternative embodiment plurality of offset timing shaft (shown and explained in conjunction with FIG. 2-3) may connected to the plurality of TRSs (shown and explained in conjunction with FIG. 3).

Figure 2:
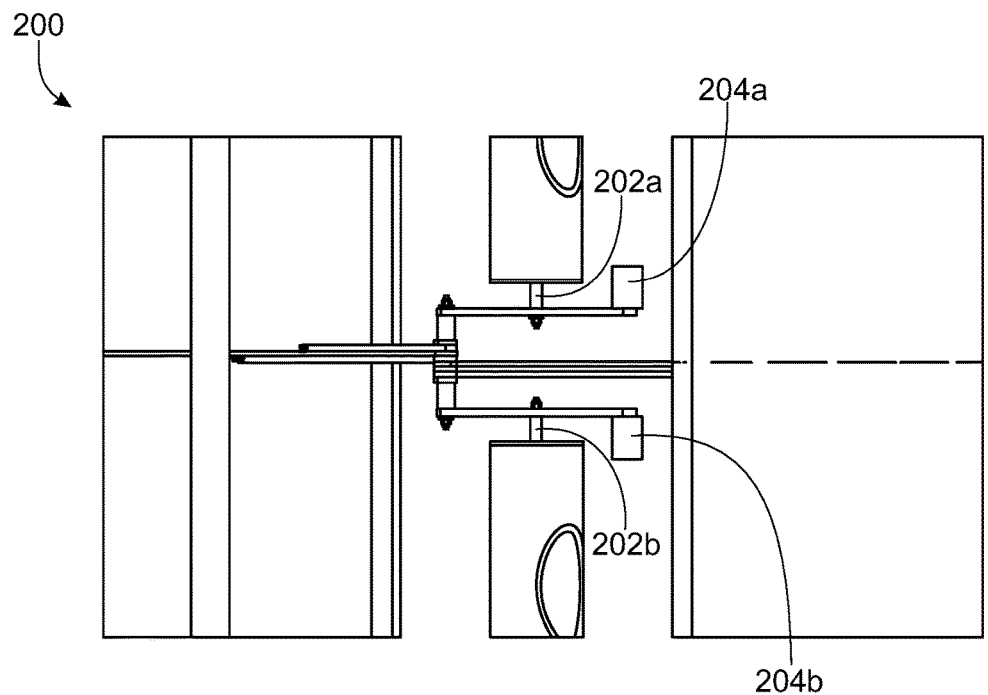
FIG. 2 illustrates an exploded view of the offset shaft assembly, in accordance with at least one embodiment.

FIG. 2 illustrates an exploded view of offset shaft assembly 200, in accordance with at least one embodiment. A plurality of carousal shafts 202a and 202b is operatively connected to the fixed turbine axis 102 (shown in FIG. 1). The plurality of carousal shafts includes a top carousal shaft 202a and a bottom carousal shaft 202b. The bottom carousal shaft 202b is coupled to the top carousal shaft 202a. In one embodiment, the top carousal shaft 202a and the bottom carousal shaft 202b are mounted to central carousal plates 104a and 104b (shown in FIG. 1), located at the center of the carousal. Therefore, carousal plates 104a and 104b (shown in FIG. 1) are attached to the plurality of carousal shafts 202a and 202b. The offset shaft assembly 200 further includes a top counterweight 204a and a bottom counterweight 204b to form a junction between the top carousal shaft 202a and the bottom carousal shaft 202b.

Turbine blades 106a, 106b, 106c, 106d, 106e, and 106f (shown in FIG. 1) are pivotally attached to the plurality of carousal plates 104a and 104b. The plurality of turbine blades 106(a-f) includes one or more first turbine blades to receive wind. One or more second turbine blades are not exposed to wind. In one embodiment, the first turbine blade is exposed to a maximum area by stretching it away from the fixed turbine axis 102, and the second turbine blade gets folded inside toward the fixed turbine axis 102. Offset shaft assembly 200 is configured at the middle part of the fixed turbine axis 102 (shown in FIG. 1).

Figure 3:
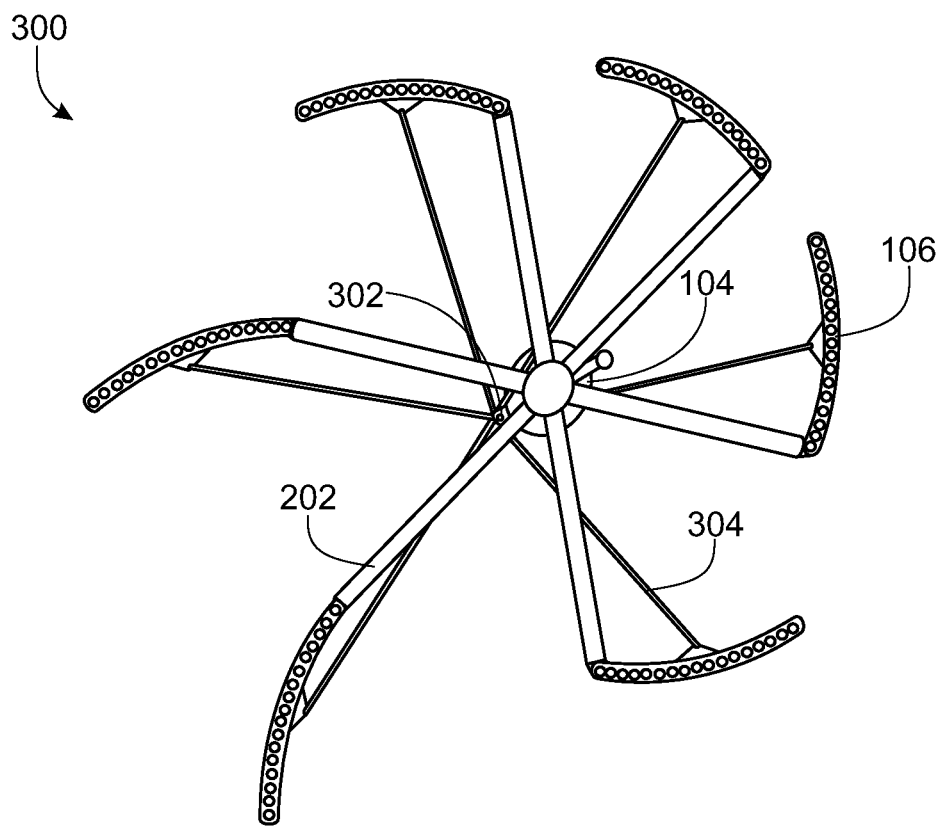
FIG. 3 illustrates the top view of the VAWT apparatus, in accordance with at least one embodiment.

FIG. 3 illustrates the top view 300 of apparatus 100, in accordance with at least one embodiment. Offset shaft assembly 200 (shown in FIG. 2) includes an offset timing shaft (OTS) 302 suspended to carousal shaft 202. In one embodiment, the OTS 302 is offset from the center of plurality of carousal plates 104a and 104b. It floats freely from the suspended carousal shaft 202, in order to reduce the aerodynamic drag.

The offset timing shaft (OTS) 302 is placed within the fixed turbine axis 102. The plurality of OTS 302 is positioned in the direction of the first turbine blade exposed to wind. Offset shaft assembly 200 further includes a plurality of counterweights 204 (shown in FIG. 2) to form a junction between the top carousal shaft 202a and the bottom carousal shaft 202b. The plurality of counterweights 204 includes a top counterweight 204a and a bottom counterweight 204b.

TRS 304 emerges from offset timing shaft 302 to connect with a plurality of turbine blades 106 in order to execute the operations of stretching away and folding inside. In an embodiment the TRS 304 is preferably connected at the central region of the turbine blade 106, TRS 304 controls the blade's opening and closing operations. TRS 304 for each turbine blade 106 is connected to OTS 302. In an alternative embodiment TRS 304 is used to restrict the movement of the OTS 302 due to wind forces being applied to the turbine blades 106(a-f). Further, in another embodiment the TRS 304 comprises two cylindrical tubes with shock absorbing mechanism or sudden thrust dampener, which may reduce the sudden air blow associated damages. Furthermore, the TRS 304 is connected with shaft alignment and synchronization control or feedback loop in order to regulate axial movements of OTS 302.

Turbine blade 106 is modeled on an airplane wing, because in the present VAWT, these blades function like an airplane wing. As wind hits the turbine blades, the blades will drive the top and bottom carousals to turn the generator (shown in FIG. 5). The blade creates a vacuum on the backside of the turbine blade to increase the forward drive force.

Figure 4:
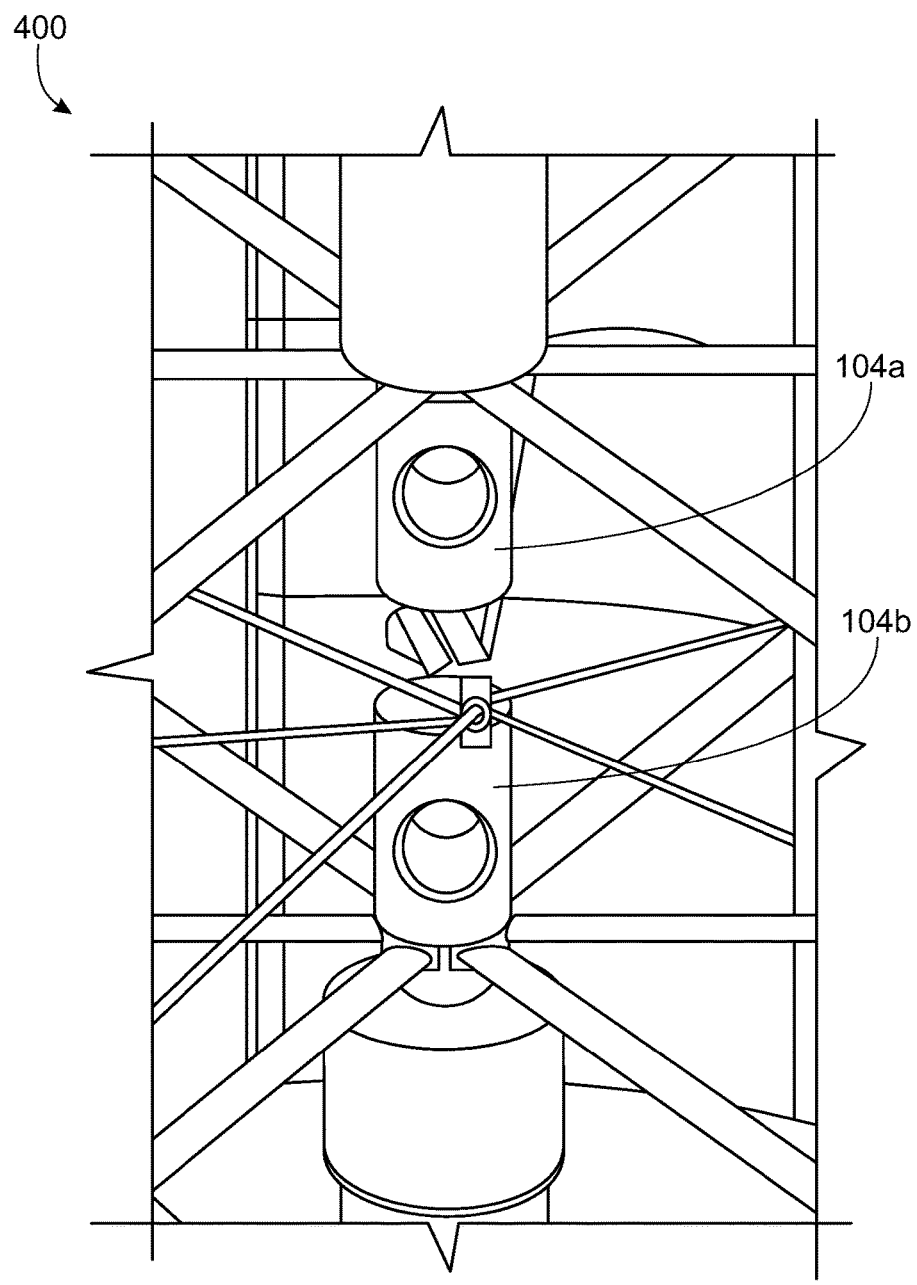
FIG. 4 illustrates an exploded view of the carousal plates, in accordance with at least one embodiment.
Figure 5:
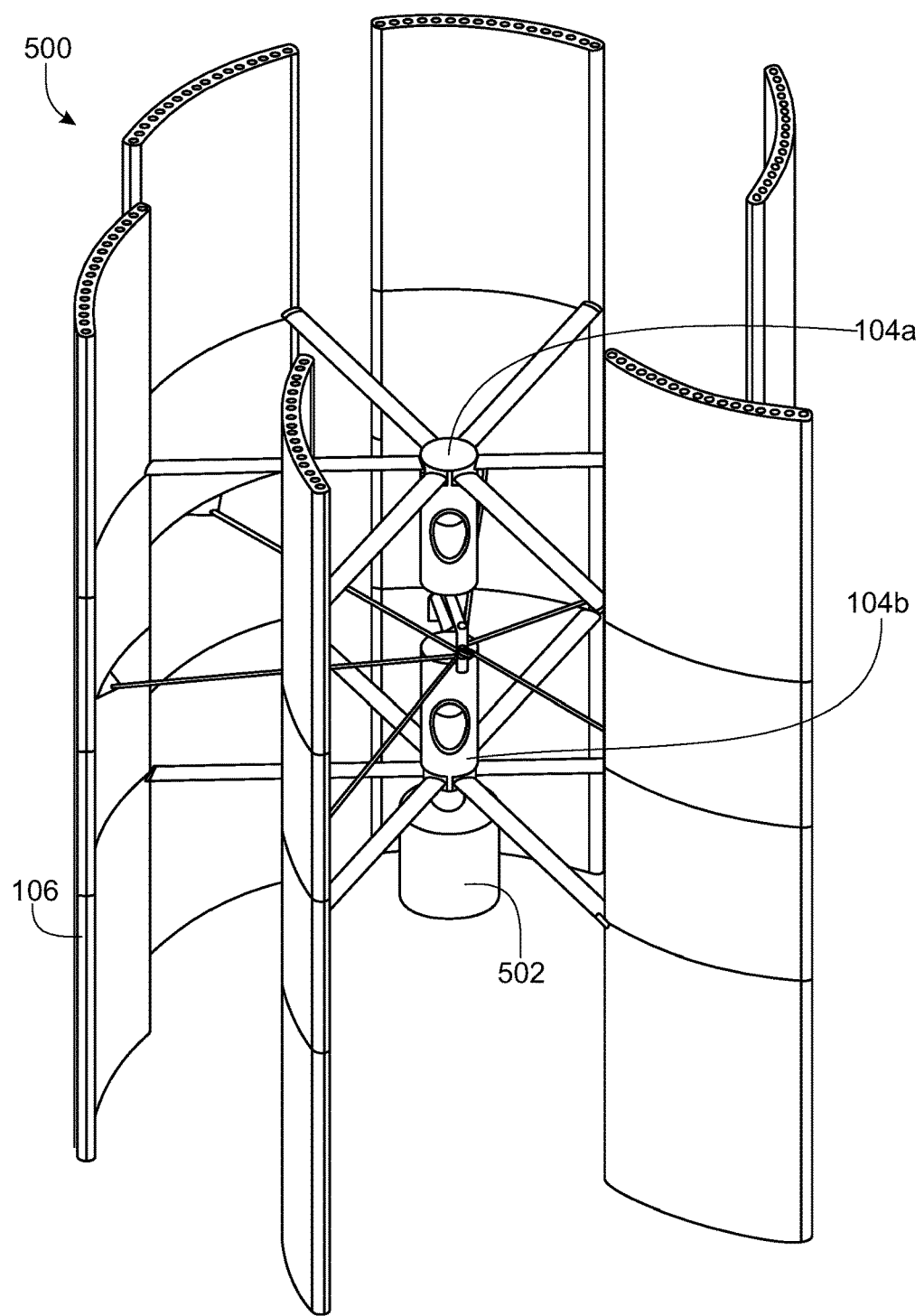
FIG. 5 illustrates an exemplary view of the VAWT, in accordance with at least one embodiment.

FIG. 4 illustrates an exploded view 400 of carousal plates 104a and 104b, in accordance with at least one embodiment. FIG. 4 is described in conjunction with FIG. 5. FIG. 5 illustrates a side view 500 of a VAWT, in accordance with at least one embodiment. The top carousal plate 104a is attached to the top carousal shaft 202a. The bottom carousal plate 104b is attached to the bottom carousal shaft 202b. The apparatus 100 further includes a generator 502. In alternative embodiment, generator comprises six separate subunits which are connected to individual turbine blades to generate energy. The entire carousal assembly (104 and 202) rotates in order to power the generator 502. The present carousal assembly (104 and 202) takes advantage of the additional rotational speed possible for offset shaft assembly 200 from the timing and restricting shaft (304) of individual turbine blades 106, enhancing the effect of the actual wind speed.

The plurality of turbine blades 106 (a-f) are hinged to top carousal shaft 202a and bottom carousal shaft 202b with a pin and bearing assembly, in order to receive wind and drive top carousal shaft 202a and bottom shaft 202b. In an alternative embodiment the pin and bearing assembly may also provide the pivotal movement to the top carousal shaft 202a and bottom carousal shaft 202b. The apparatus 100 may include a control mechanism such as hydraulic, electric, or mechanical to orchestrate the closing and opening of the turbine blades 106 (a-f). Further the apparatus 100 may include sensing units to monitor the movement of the turbine blades 106 (a-f) and also measures the position of the turbine blades 106 (a-f). Furthermore, the apparatus 100 may also include a diagnostic unit to autocorrect the opening and closing sequences of the turbine blades 106 (a-f). Additionally, the apparatus 100 may include a transmitting unit to receive the sensed data from the sensing units and transmits the data to a remote monitoring unit. The plurality of turbine blades 106 includes six turbine blades: 106a, 106b, 106c, 106d, 106e, and 106f.

Generally, the turbine blades—106a, 106b, 106c, 106d, 106e, and 106f are made of the fibre reinforced plastic (FRP) webs surrounded by two FRP shells acting as aerodynamic fairings. FRP provides a lightweight structure to the turbine blades 106 (a-f). The plurality of turbine blades 106 (a-f) are shaped to generate the maximum power from the wind. Primarily the design is driven by the aerodynamic requirements. Just like an airplane wing, turbine blades 106(a-f) operate by generating lift due to the shape of the turbine blades 106(a-f). The more curved side generates low air pressures while high pressure air pushes on the other side of the aerofoil. The net result is a lift force perpendicular to the direction of flow of the air. In an embodiment the plurality of turbine blades 106 (a-f) include corrugations to increase the stiffness of the apparatus 100.

Apparatus 100 includes a generator 502, driven by top carousal shaft 202a and bottom carousal shaft 202b. For example, top carousal plate 104a turns a shaft that extends both above and below top carousal plates 104a, and 104b. The shaft that extends below top carousal plate 104a is matted with top offset shaft assembly 200. The offset shaft assembly 200 takes the center of the carousal and moves it to an offset position that allows turbine blades 106(a-f) to open to its maximum position. Alternatively, a control sequence regulates the opening and closing of the turbine blades 106(a-f). Subsequently, counterweight 204 offsets the weight of open turbine blades 106, driving the VAWT. Bottom carousel plate 104b also has a shaft extending through it, both above and below the plate. The shaft extending above the carousal plate is attached to the bottom of the offset shaft assembly. The shaft extending below the bottom carousal plate drives the generator 502.

Thus, the present VAWT can be installed in various locations, such as roofs, highways, and parking lots. Furthermore, the present VAWT apparatus produces less noise and can be scaled from milliwatts to megawatts. The present turbine has a simpler construction because the offset shaft is located within the turbine axis. Also, the counterweights of the present invention provide more stability to the offset shaft operation.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

What is claimed is:

1. A vertical axis wind turbine apparatus, comprising:
a fixed turbine axis;
a plurality of carousal shafts operatively connected to the fixed turbine axis;
a plurality of carousal plates attached to the plurality of carousal shafts;
a plurality of turbine blades pivotally attached to the plurality of carousal plates, the plurality of turbine blades comprising: one or more first turbine blades to receive wind and one or more second turbine blades that are not exposed to wind, wherein one or more first turbine blades are exposed to a maximum area by stretching away from the fixed turbine axis, and the one or more second turbine blades get folded inside toward the fixed turbine axis;

an offset shaft assembly configured at a middle part of the fixed turbine axis, wherein the offset shaft assembly comprising:

a plurality of offset timing shafts suspended to the plurality of carousal shafts, wherein the offset timing shafts is offset from the center of the plurality of carousal plates and floats freely from the respective suspended carousal shaft in order to reduce the aerodynamic drag; and a plurality of counterweights form a junction between the top carousal shaft and the bottom carousal shaft; and a plurality of timing and restricting shafts emerge from the offset timing shaft to connect with the plurality of turbine blades, in order to execute the operations of stretching away and folding inside.

2. The apparatus according to claim 1, wherein the plurality of carousal shafts comprising a top carousal shaft mounted on the fixed turbine axis; and a bottom carousal shaft coupled with the top carousal shaft, wherein the top carousal shaft and the bottom carousal shaft are rotatably mounted on the fixed turbine axis.

3. The apparatus according to claim 1, wherein the plurality of carousal plates comprising a top carousal plate attached to the top carousal shaft; and a bottom carousal plate attached to the bottom carousal shaft.

4. The apparatus according to claim 1, wherein the plurality of turbine blades are hinged to the top and bottom carousal shafts with a pin and bearing assembly, in order to receive wind and drive the shafts.

5. The apparatus according to claim 1 further includes a generator driven by the top carousal shaft and the bottom carousal shaft.

6. The apparatus according to claim 1, wherein the offset timing shafts is placed within the fixed turbine axis.

7. The apparatus according to claim 1, wherein the plurality of the offset timing shafts positioned in the direction of the first turbine blade is exposed to wind.

8. The apparatus according to claim 1, wherein the plurality of counterweights comprises a top counterweight and a bottom counterweight.

9. The apparatus according to claim 1, wherein the plurality of turbine blades includes six turbine blades.

* * * * *